United States Patent
Braford, Jr.

(10) Patent No.: US 12,359,716 B1
(45) Date of Patent: Jul. 15, 2025

(54) ELECTRIC DRIVE MODULE DUAL SUMP ARRANGEMENT FOR OIL MANAGEMENT

(71) Applicant: FCA US LLC, Auburn Hills, MI (US)

(72) Inventor: Thomas E Braford, Jr., Brighton, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/594,508

(22) Filed: Mar. 4, 2024

(51) Int. Cl.
*F16H 57/04* (2010.01)
*F16H 57/02* (2012.01)
*H02K 7/116* (2006.01)
*H02K 9/19* (2006.01)

(52) U.S. Cl.
CPC ......... *F16H 57/0409* (2013.01); *F16H 57/02* (2013.01); *F16H 57/0412* (2013.01); *F16H 57/0423* (2013.01); *F16H 57/0436* (2013.01); *F16H 57/0452* (2013.01); *F16H 57/0457* (2013.01); *F16H 57/0476* (2013.01); *H02K 7/116* (2013.01); *H02K 9/19* (2013.01); *F16H 2057/02034* (2013.01); *F16H 2057/02043* (2013.01)

(58) Field of Classification Search
CPC ............. F16H 57/0409; F16H 57/0423; F16H 57/0457
See application file for complete search history.

(56) References Cited

U.S. PATENT DOCUMENTS

| | | | | |
|---|---|---|---|---|
| 3,529,698 A | * | 9/1970 | Nelson | F16H 57/0447 184/6.12 |
| 4,169,519 A | * | 10/1979 | Hirt | F16H 57/0447 184/6.12 |
| 4,721,184 A | * | 1/1988 | Sowards | F16N 29/04 184/6.12 |
| 7,213,682 B2 | * | 5/2007 | Gibson | F16H 57/0421 184/6.12 |
| 8,534,425 B2 | * | 9/2013 | Jabs | F16H 57/0447 184/11.1 |
| 8,931,597 B2 | * | 1/2015 | White | B06B 1/16 184/32 |
| 9,297,454 B2 | * | 3/2016 | Barthel | F16H 57/0495 |
| 10,859,152 B2 | * | 12/2020 | Yu | F16H 57/0475 |
| 12,098,766 B2 | * | 9/2024 | Greiter | F16H 57/0445 |
| 2002/0195296 A1 | * | 12/2002 | Maret | F16N 17/00 184/6.22 |
| 2006/0076193 A1 | * | 4/2006 | Ruther | F16H 57/0456 184/6.12 |

(Continued)

*Primary Examiner* — Michael A Riegelman
(74) *Attorney, Agent, or Firm* — Jeremy J. Klobucar

(57) ABSTRACT

A thermal management system for an electric drive module (EDM) in an electric vehicle is provided. The system includes a motor housing, a gearbox housing, a sump and a baffle. The motor housing has an electric motor. The gearbox housing houses gears that receive an input from the electric motor and transfer the drive torque to the driveline. The sump collectively comprises a first sump and a second sump. The first sump is defined by first walls of the motor housing. The second sump is defined by second walls of the gearbox housing. The baffle is disposed in the sump. Rotation of a transfer gear causes oil disposed in the second sump to be urged from the second sump, along the baffle and to the first sump effectively reducing an oil level in the gearbox housing and thereby reducing drag losses in the gearbox housing.

10 Claims, 4 Drawing Sheets

(56) References Cited

U.S. PATENT DOCUMENTS

| | | | |
|---|---|---|---|
| 2010/0081536 A1* | 4/2010 | Braford, Jr. | F16H 3/006 |
| | | | 475/303 |
| 2012/0286607 A1* | 11/2012 | Shimizu | F16H 57/0471 |
| | | | 310/90 |
| 2013/0133454 A1* | 5/2013 | Barthel | F03D 80/70 |
| | | | 74/468 |
| 2022/0042591 A1* | 2/2022 | Yu | F16H 57/0471 |
| 2022/0282784 A1* | 9/2022 | Nakata | F16H 57/0424 |
| 2022/0316581 A1* | 10/2022 | Li | B60K 17/04 |
| 2022/0388391 A1* | 12/2022 | Gowrisankar | F16H 37/0813 |
| 2023/0067898 A1* | 3/2023 | Oki | F16H 57/0409 |
| 2023/0261542 A1* | 8/2023 | Yamaguchi | F16H 63/3425 |
| | | | 310/54 |

* cited by examiner

ELECTRIC DRIVE MODULE DUAL SUMP ARRANGEMENT FOR OIL MANAGEMENT

FIELD

The present application generally relates to battery electric vehicles (BEVs) and, more particularly, to an electric drive module having a dual sump arrangement for oil volume lubrication management.

BACKGROUND

Some battery electric vehicles (BEVs) include an electric drive module (EDM) for propulsion. EDMs have electric motors that are cooled by thermal systems to prevent overheating. However, in some examples such conventional thermal systems may insufficiently or inefficiently provide coolant (e.g., oil) pump flow required for cooling and/or lubricating each element in the system. For example, some coolant pumps are configured to provide constant flow rates to the EDM's, even when a reduced flow rate would be sufficient to cool the EDM. Insufficient cooling and/or lubricating may result in higher operating temperatures that can affect the overall motoring performance, reliability and efficiency of the machine. Typically, the oil volume for the EDM is set based on a maximum flow rate requirement for the pump. It is undesirable to turn over the oil within the system more times than is necessary. In examples, such a situation can cause excessive aeration and foaming of the oil from running it through the pump and not providing sufficient time for the air to escape from the oil. Accordingly, while such conventional thermal systems do work well for their intended purpose, there exists an opportunity for improvement in the relevant art.

SUMMARY

According to one example aspect of the invention, a thermal management system for an electric drive module (EDM) configured to generate and transfer drive torque to a driveline for propulsion of an electric vehicle is provided. The system includes a motor housing, a gearbox housing, a sump and a baffle. The motor housing has an electric motor. The gearbox housing houses gears that receive an input from the electric motor and transfer the drive torque to the driveline. The gears include a transfer gear. The sump collectively comprises a first sump and a second sump. The first sump is defined by first walls of the motor housing. The second sump is defined by second walls of the gearbox housing. The baffle is disposed in the sump. Rotation of the transfer gear causes oil disposed in the second sump to be urged from the second sump, along the baffle and to the first sump effectively reducing an oil level in the gearbox housing and thereby reducing drag losses in the gearbox housing.

According to other features, the transfer gear defines gear teeth. The gear teeth urge the oil from the second sump along the baffle and into the first sump due to rotation of the transfer gear.

In other features, the first sump is defined at a higher elevation compared to the second sump.

In other features, during operation of the EDM, a coolant level of the second sump is lower than a coolant level of the first sump.

In addition to the foregoing, the thermal management system further includes a pump that delivers the coolant through a hydraulic circuit to the EDM.

In addition to the foregoing, the motor housing defines at least two shower heads that dispense coolant onto components of the electric motor.

In other features, the thermal management system further includes a controller that is configured to: receive inputs from sensors; determine a speed and torque of the motor based on the inputs; and command the pump to operate at the determined speed and torque.

According to another example aspect of the invention, a thermal management system for an electric drive module (EDM) configured to generate and transfer drive torque to a driveline for propulsion of an electric vehicle is provided. The system includes a motor housing, a gearbox housing, a sump and a baffle. The motor housing has an electric motor. The gearbox housing houses gears that receive an input from the electric motor and transfer the drive torque to the driveline. The gears include a transfer gear. The sump collectively comprises a high sump and a low sump. The high sump is defined by the motor housing. The low sump is defined by the gearbox housing. The baffle is disposed in the sump. Rotation of the transfer gear causes oil disposed in the low sump to be urged from the low sump, along the baffle and to the high sump effectively reducing an oil level in the gearbox housing and thereby reducing drag losses in the gearbox housing.

According to other features, the transfer gear defines gear teeth. The gear teeth urge the oil from the second sump along the baffle and into the first sump due to rotation of the transfer gear.

In additional features, the high sump is defined at a higher elevation compared to the low sump.

In other features, during operation of the EDM, an oil level of the low sump is lower than an oil level of the high sump.

In other features, the thermal management system further comprises a pump that delivers the oil through a hydraulic circuit to the EDM.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As identified above, an electric drive module (EDM) on an electric vehicle requires sufficient lubrication and cooling. Typically, the oil volume for the EDM is set based on a maximum flow rate requirement for the pump. It is undesirable to turn over the oil within the system more times than is necessary. In examples, such a situation can cause excessive aeration and foaming of the oil from running it through the pump and not providing sufficient time for the air to escape from the oil. Excessive aeration has a negative impact on thermal transfer of heat energy from components to the oil and reduced thermal transfer efficiency of the heat exchanger. The excessive foaming of the oil can result in oil getting to a vent of the EDM and being expelled out of the gearbox. In some prior art examples, baffles are incorporated around the rotating gears to reduce drag. However, baffles introduce increased complexity in the EDM and increase cost.

Described herein are systems and methods for thermal management of an EDM for an electric vehicle. The EDM systems and methods described herein provide a cooling and lubrication solution for electric motors housed within the EDM (or a hybrid transmission). A dual pump supplies coolant (e.g., oil) to various components of the EDM. The dual sump includes a first or high sump generally aligned with the motor housing of the EDM and a second or low sump generally aligned with the gears in the gearbox of the EDM.

An oil transfer mechanism urges oil from the low sump to the high sump allowing an increased oil volume for the system while reducing the necessary oil level in the gearbox section of the EDM. As less gear mass is rotating in oil, energy losses are minimized. In the example discussed herein, the oil transfer mechanism is a transfer gear in the gearbox of the EDM. The dual sump configuration inhibits excessive foaming, aeration, oil expulsion out of the vent and system drag. The dual sump configuration also improves overall thermal management of the EDM.

Figure 1:
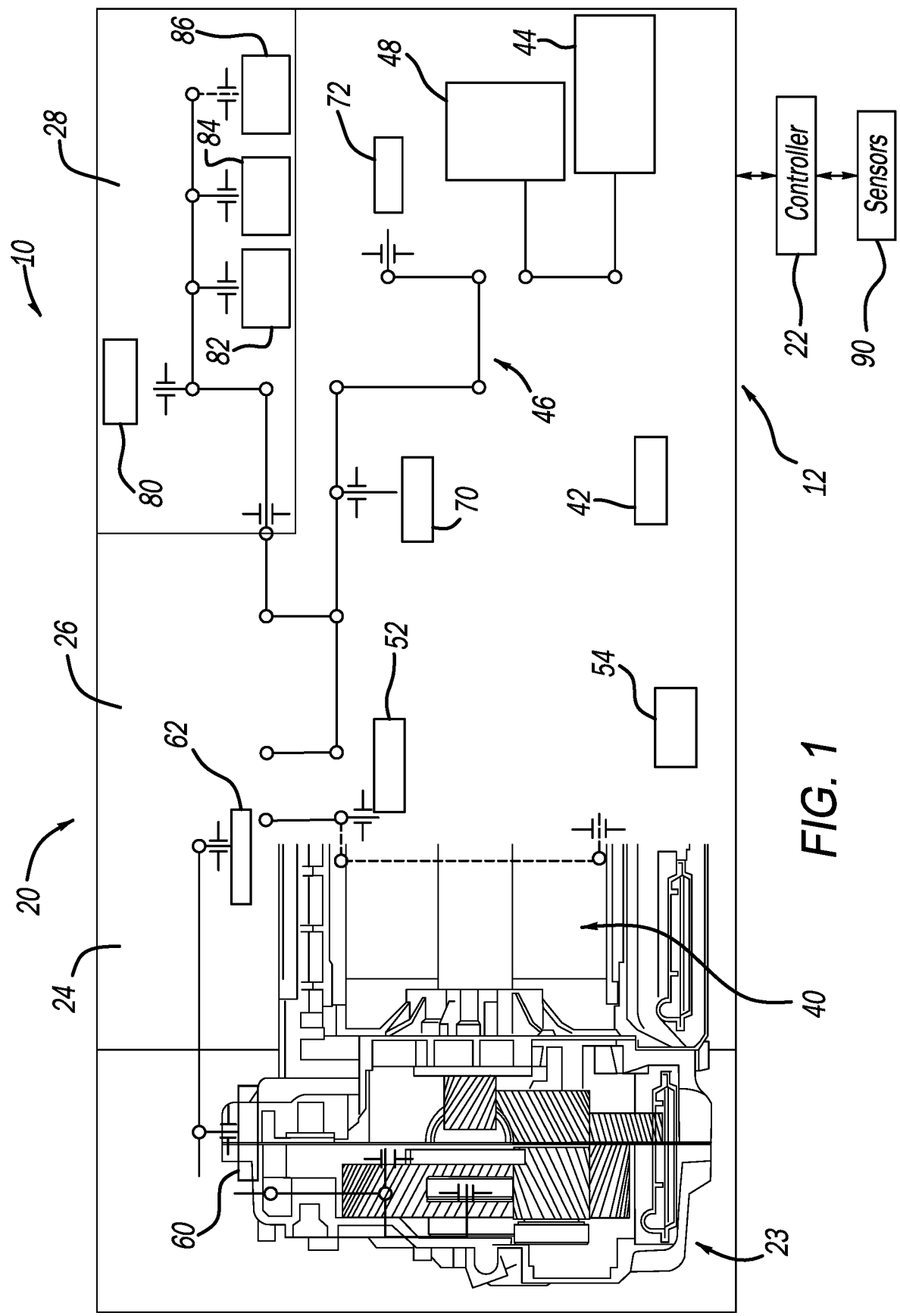
FIG. 1 is a schematic illustration of an example electric drive module (EDM) for a battery electric vehicle (BEV) with a thermal management system in accordance with the principles of the present application.
Figure 2:
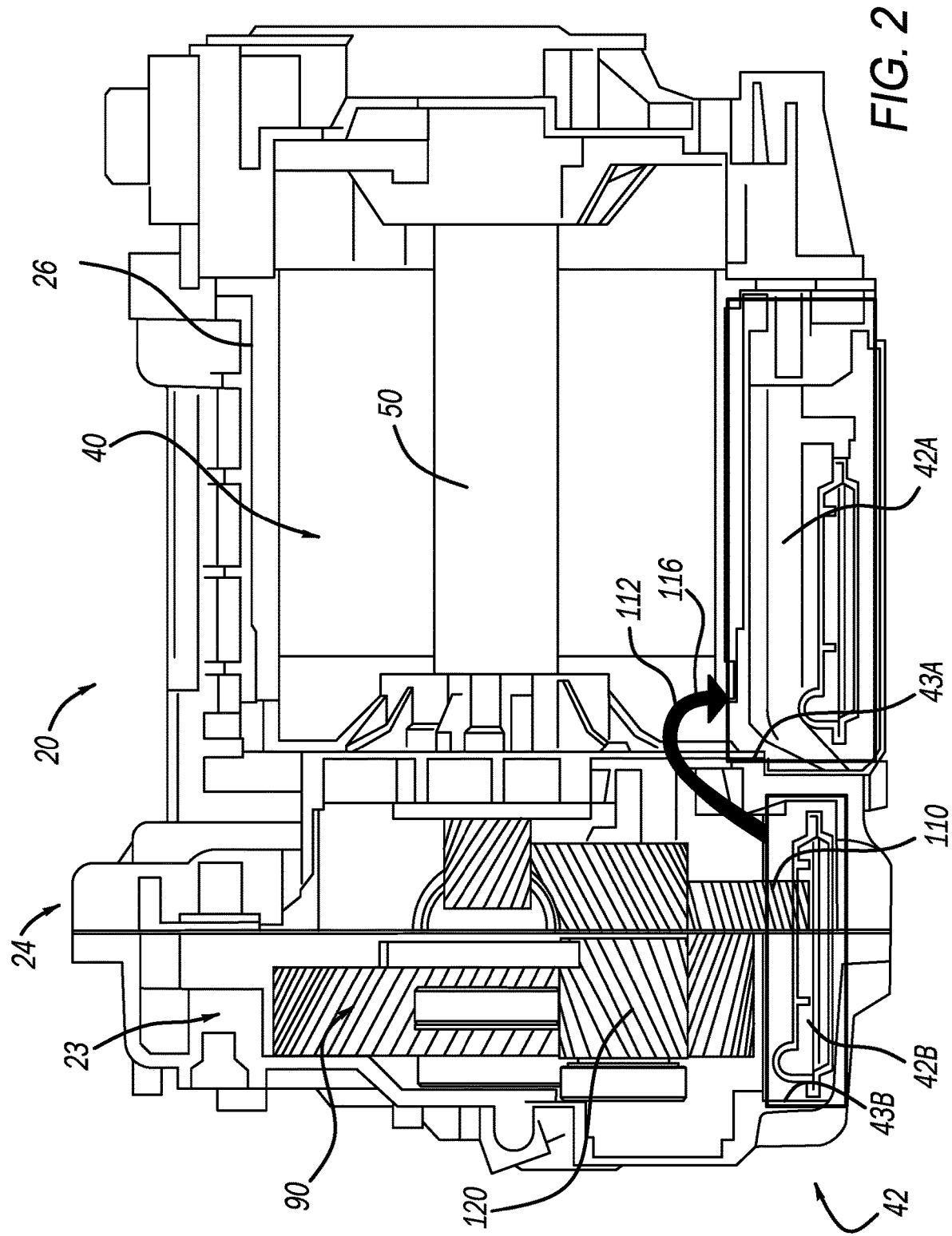
FIG. 2 is sectional view of the EDM of FIG. 1 illustrating a dual sump arrangement according to principles of the present application.

Referring now to FIGS. 1 and 2, a schematic illustration of a BEV 10 (hereinafter, "vehicle 10") having an example thermal management system 12 according to the principles of the present application is illustrated. The thermal management system 12 generally comprises an electric drive module (EDM) 20 that communicates with a controller 22. The EDM 20 is configured to generate and transfer drive torque through a gearbox or transmission 23 to a driveline (not shown) for vehicle propulsion.

In the example embodiment, the EDM 20 generally comprises a motor cover 24, a motor housing 26 and a gear cover 28. A motor 40 is generally disposed in the motor housing 26. A sump (FIG. 2) collectively identified at 42 includes a first or high sump 42A and a second or low sump 42B. The high sump 42A can be defined by walls 43A of the motor housing 26. The low sump 42B can be defined by a gearbox housing or walls 43B of the gearbox 23. The sump 42B is arranged generally in the gearbox 23, while the sump 42A is generally arranged in the motor housing 26. The sump 42 is configured to receive the coolant after it has flowed across the features of the EDM 20. A pump 44 draws coolant from the sump 42 to repeat the cooling circuit as needed. The pump 44 delivers coolant (e.g., oil) through a coolant delivery circuit or manifold 46. A heat exchanger (WTOC) 48 is provided in the fluid circuit 46 generally near the pump 44 to provide a heating input or output to the coolant.

The motor 40 generally includes a rotor shaft 50 an input motor bearing 52, end windings 54, a first shower head 60, a second shower head 62 and a poppet valve 66. The first and second shower heads 60 and 62 can dispense coolant onto components (e.g., rotor, stator, windings etc.) of the motor 40. A differential 70 is incorporated within the motor housing 26. The gear cover 28 can include a front differential bearing 80, a front transfer bearing 82, a front input bearing 84 and an optional gear spray 86. As shown, the pump 44 is configured to deliver coolant to various components of the EDM 20 through the manifold 46.

The controller 22 receives inputs from sensors 90. The sensors 90 can provide inputs that the controller 22 can use to determine a speed and a torque of the motor 40.

In the example embodiment, the thermal management system 12 is configured to provide a fluid (e.g., oil) for lubrication and/or cooling to various components of the EDM 20 and generally includes the fluid circuit 46, the high sump 42A, the low sump 42B, the pump 44, the shower heads 60, 62, the sensors 90 and the controller 22. In the example embodiment, the pump 44 is configured to supply the fluid through the fluid circuit 46 to the motor 40 and other components of the EDM (e.g., differential 70 and various bearings shown). The sump 42 is configured to act as a reservoir to receive and collect the used/heated fluid after lubricating/cooling the EDM components.

During operation of the EDM 20, gears 90 in the gearbox 24 are rotating. According to the present disclosure, a transfer gear 110 of the gears 90 is used to urge or push oil 112 from the low sump 42B up a baffle or trough 114 (FIG. 3) to a higher level and into the high sump 42A as illustrated at arrow 116. In particular, teeth 113 (FIG. 3) of the transfer gear 112 splash the oil up along the trough 114 to move the oil 112 from the low sump 42B to the high sump 42A. The goal is to lower the level of oil 112 in the gearbox 23 to reduce drag losses of the transfer gear 110 and other gears 90 in the gearbox 23 such as an output gear 120 by reducing the portion of the gears 90 that encounter the oil 112. The transfer gear 110, trough 114 and dual sump arrangement 42A and 42B achieve this desired effect.

Figure 3:
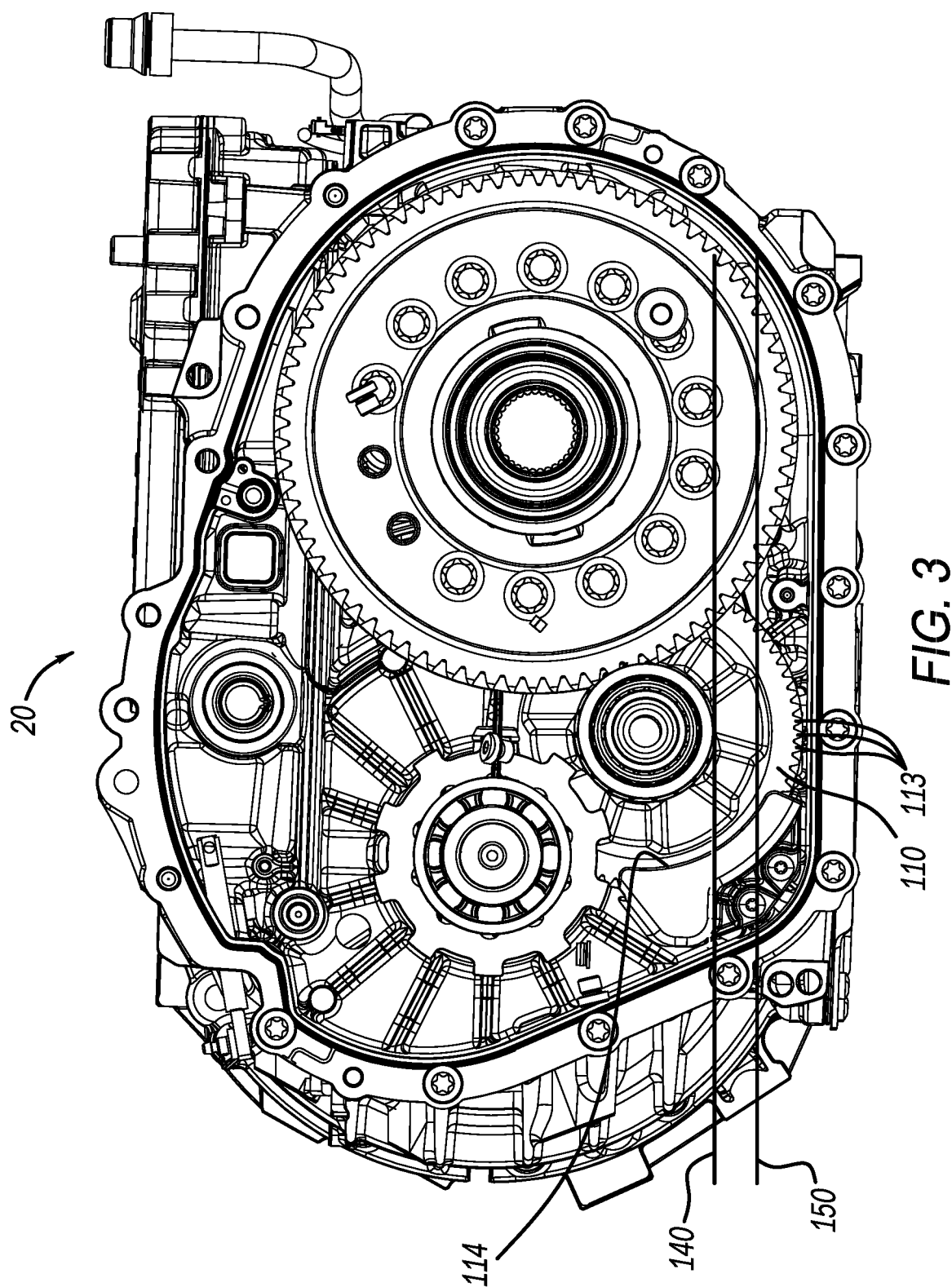
FIG. 3 is a front view of the EDM of FIG. 2 illustrating an oil level for the dual sump according to features of the present application as compared to an oil level needed for a conventional single sump.

With additional reference to FIG. 3, additional features of the instant EDM 20 will be described. In prior art single sump arrangements, an operating oil level is identified at 140. In comparison, the dual sump arrangement of the instant application allows a reduced operating oil level identified at 150. With low profile vehicles, the vertical space available for the EDM 20 to fit within the vehicle is limited. The oil level in a single sump system needs to be high enough to meet gradeability requirements to allow the inlet of the suction filter to remain covered under all gradeability requirements. As described herein, the dual sump 42 operates the EDM 20 at two operating oil levels. In the gearbox side, the oil level while the vehicle 10 is operating under normal conditions will be reduced by using the trough 114 to move oil from the gearbox housing section to the motor housing section.

Figure 4:
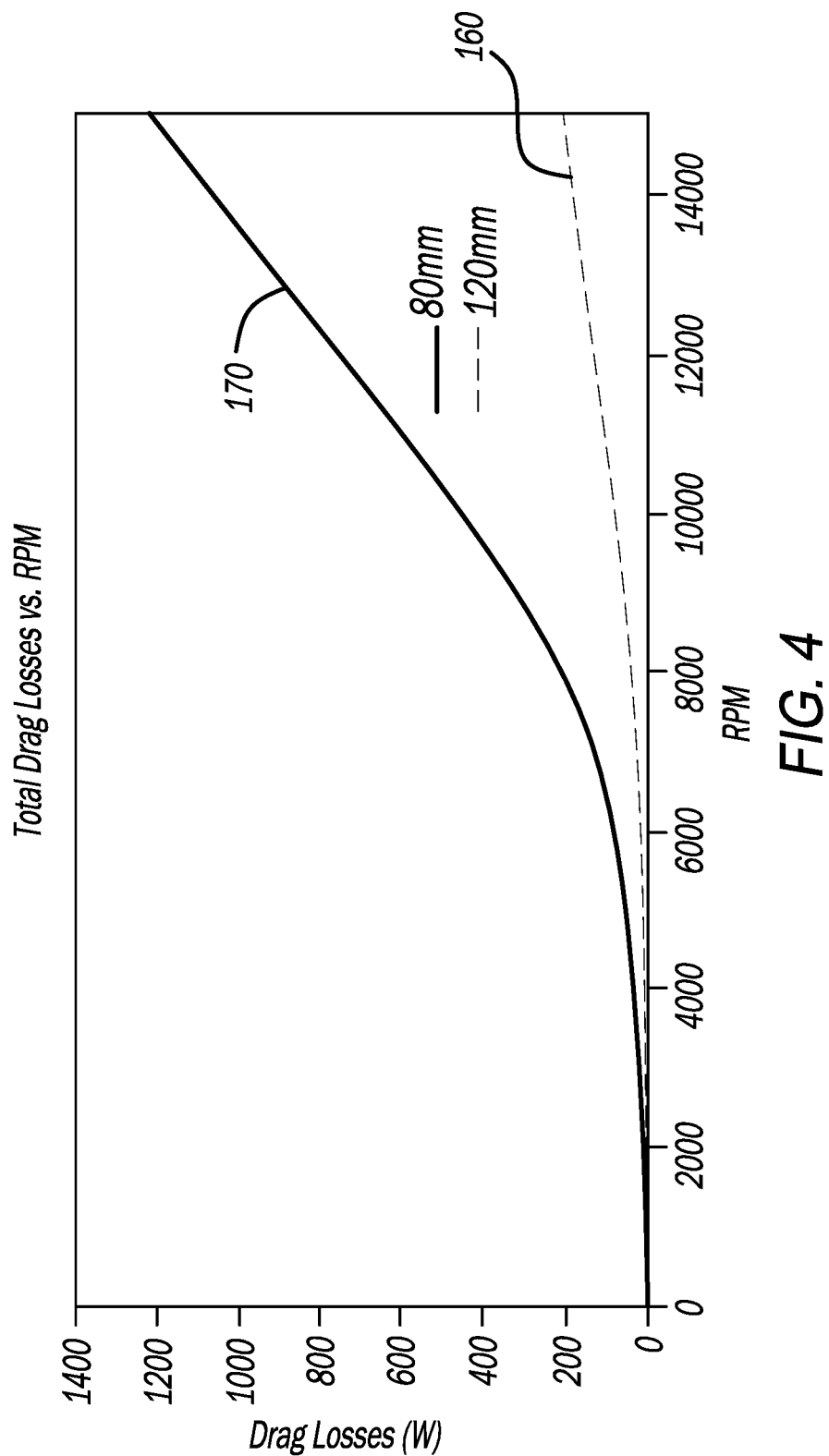
FIG. 4, is a plot of total drag losses versus RPM for a gearbox operating with an oil level 80 mm below a centerline of the motor as compared to an oil level 120 mm below a centerline of the motor.

With additional reference to FIG. 4, a plot of total drag losses versus RPM for a gearbox operating with an oil level 80 mm below a centerline of the motor 40 as compared to an oil level 120 mm below a centerline of the motor 40. As shown, gear losses 160 are significantly reduced when operating with a lower level of oil in the gearbox 23 as compared to gear losses 170 improving efficiency in the system. It is appreciated that other oil levels are contemplated with the takeaway being a reduced level of oil reduces drag loses. In examples, operating the vehicle 10 at speeds above 25 miles per hour (MPH) has shown to lower power consumption from 20 watts all the way to 1000 watts at maximum vehicle speed (as compared to single sump EDM's). Other wattage improvements are contemplated.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A thermal management system for an electric drive module configured to generate and transfer drive torque to a driveline for propulsion of an electric vehicle, the thermal management system comprising:
    a motor housing having an electric motor;
    a gearbox housing that houses gears that receive an input from the electric motor and transfer the drive torque to the driveline, the gears including a transfer gear;
    a sump collectively comprising:
        a first sump defined by first walls of the motor housing; and
        a second sump defined by second walls of the gearbox housing;
    a pump that delivers the coolant through a hydraulic circuit to the electric drive module;
    a baffle disposed in the sump, wherein rotation of the transfer gear causes coolant disposed in the second sump to be urged from the second sump, along the baffle and to the first sump effectively reducing coolant level in the gearbox housing and thereby reducing drag losses in the gearbox housing; and
    a controller configured to:
        receive inputs from sensors;
        determine a speed and torque of the motor based on the inputs; and
        command the pump to operate at the determined speed and torque.

2. The thermal management system of claim 1, wherein the transfer gear defines gear teeth, wherein the gear teeth urge the coolant from the second sump along the baffle and into the first sump due to rotation of the transfer gear.

3. The thermal management system of claim 2, wherein the first sump is defined at a higher elevation compared to the second sump.

4. The thermal management system of claim 3, wherein during operation of the electric drive module a coolant level of the second sump is lower than a coolant level of the first sump.

5. The thermal management system of claim 1, wherein the motor housing defines at least two shower heads that dispense coolant onto components of the electric motor.

6. The thermal management system of claim 1, wherein the coolant comprises oil.

7. A thermal management system for an electric drive module configured to generate and transfer drive torque to a driveline for propulsion of an electric vehicle, the thermal management system comprising:
    a motor housing having an electric motor;
    a gearbox housing that houses gears that receive an input from the electric motor and transfer the drive torque to the driveline, the gears including a transfer gear;
    a sump collectively comprising:
        a high sump defined by the motor housing; and
        a low sump defined by the gearbox housing; and
    a pump that delivers the oil through a hydraulic circuit to the electric drive module;
    a baffle disposed in the sump, wherein rotation of the transfer gear causes oil disposed in the low sump to be urged from the low sump, against the baffle and into the high sump effectively reducing an oil level in the gearbox housing and thereby reducing drag losses in the gearbox housing; and
    a controller configured to:
        receive inputs from sensors;
        determine a speed and torque of the motor based on the inputs; and
        command the pump to operate at the determined speed and torque.

8. The thermal management system of claim 7, wherein the transfer gear defines gear teeth, wherein the gear teeth urge the oil from the low sump along the baffle and into the high sump due to rotation of the transfer gear.

9. The thermal management system of claim 8, wherein the high sump is defined at a higher elevation compared to the low sump.

10. The thermal management system of claim 9, wherein during operation of the electric drive module an oil level of the low sump is lower than an oil level of the high sump.

* * * * *